United States Patent
Le Louarn et al.

(10) Patent No.: US 8,464,968 B2
(45) Date of Patent: Jun. 18, 2013

(54) SYSTEM FOR THE SPRAYING OF SPRAY LIQUID FOR AIRCRAFT WINDSHIELD, AND COCKPIT PROVIDED WITH SUCH A SPRAYING SYSTEM

(75) Inventors: Amelie Le Louarn, Tournefeuille (FR); Gilles Chene, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 599 days.

(21) Appl. No.: 11/763,168

(22) Filed: Jun. 14, 2007

(65) Prior Publication Data
US 2008/0087741 A1   Apr. 17, 2008

(30) Foreign Application Priority Data
Jun. 26, 2006   (FR) ..................................... 06 52647

(51) Int. Cl.
*B05B 1/10*   (2006.01)
(52) U.S. Cl.
USPC ....................................... 239/284.1; 239/413
(58) Field of Classification Search
USPC .................... 239/284.1, 284.2, 413, 433, 434
See application file for complete search history.

(56) References Cited

U.S. PATENT DOCUMENTS

| 2,240,013 | A | * | 4/1941 | Gale ............................ 239/131 |
| 3,633,827 | A | | 1/1972 | Novak |
| 3,901,444 | A | | 8/1975 | Maltbie et al. |
| 4,248,383 | A | * | 2/1981 | Savage et al. ............. 239/284.2 |
| 2003/0041900 | A1 | | 3/2003 | Wojan et al. |

FOREIGN PATENT DOCUMENTS

| GB | 1204371 | 9/1970 |
| WO | 0220316 A1 | 3/2002 |

* cited by examiner

*Primary Examiner* — Christopher Kim
(74) *Attorney, Agent, or Firm* — Greer, Burns & Crain Ltd.

(57) ABSTRACT

A system for spraying liquid (100) for a windshield (111) of an aircraft including a spray-liquid supply circuit (101), a pressurized-gas supply circuit (102) designed to purge the spray-liquid supply circuit, and at least one nozzle (114) disposed downstream from the circuits and designed to spray the spray liquid and pressurized gas on a windshield, characterized in that the system includes an auxiliary means of compression (107) ready to compress gas designed to circulate in the pressurized-gas supply circuit, the auxiliary means of compression being positioned near the nozzle. Also, an aircraft cockpit provided with at least such a spray system.

9 Claims, 4 Drawing Sheets

SYSTEM FOR THE SPRAYING OF SPRAY LIQUID FOR AIRCRAFT WINDSHIELD, AND COCKPIT PROVIDED WITH SUCH A SPRAYING SYSTEM

BACKGROUND

1. Field

The disclosed embodiments relate to a system for the spraying of spray liquid for aircraft windshields. More specifically, the disclosed embodiments relate to a purging device used to clean a spray system of this kind and eliminate all traces of spray liquid from the piping system after the spraying of such liquid. The disclosed embodiments also relate to an aircraft cockpit comprising at least one such system for the spraying of spray liquid.

When an aircraft is in flight, and in the event of heavy rain, there are known ways of improving visibility inside the aircraft cockpit by spraying a hydrophobic liquid or water-repellent liquid, most usually consisting of silicone or solvent, on the exterior of the windshield of said cockpit. The water-repellent liquid is preferably used when the aircraft is in flight because, when the aircraft is on the ground, this water-repellent liquid cannot be sprayed fast enough on the windshield.

2. Description of the Prior Art

There are known prior-art spraying systems integrated into aircraft and enabling the spraying, on command, of the water-repellent liquid on the windshield of the cockpit.

FIG. 1, pertaining to the prior art, gives a schematic view of a water-repellent spraying system 1 of this kind for aircraft windshields.

The water-repellent liquid spraying system 1 is provided with a water-repellent liquid supply circuit 2 comprising a piping system 3 designed to convey the water-repellent liquid from a tank 4, at a distance from the windshield 6, up to two nozzles 5 situated at the level of the windshield 6 of the aircraft cockpit. The water-repellent liquid is projected to the nozzles 5 through pressure within the tank 4. Generally, when said tank is full, the pressure in said tank 4 is at five bars. When the tank is empty, the pressure falls to two bars.

The aircraft pilot and/or co-pilot exercise remote control over the opening of the valves 7, situated upstream from the nozzles 5, so as to let the water-repellent liquid flow up to the nozzles 5. The term "upstream" refers to that which comes before the point considered, in the sense of flow of liquid in the supply circuit 2. When the valves 7 are closed, they block the pressurized water-repellent liquid within the piping system 3. In the event of heavy rain, to improve visibility through the windshield 6, the pilot and/or co-pilot press the control button 8 situated in the cockpit, thus actuating the temporary opening of the valves 7. When water-repellent liquid no longer needs to be sprayed on the windshield 6, the pilot and/or copilot releases the control button 8, thus closing the valves 7. The flow of water-repellent liquid is once again blocked upstream relative to the nozzles 5, at the valves 7.

The water-repellent liquid used to improve visibility through the windshield 6 has the main drawback of gradually clogging the piping system by the accumulated depositing of silicone on the walls of the piping system and in the nozzles 5. There is therefore a known way of draining the portion 9 of the supply circuit 2 situated downstream from the valves 7 so as to clean the piping system and the nozzles 5 once the water-repellent liquid has been sprayed on the windshield 6.

In the prior art, as shown in FIG. 1, the purging device 10 has a tubing 11 constantly conveying pressurized air tapped at the aircraft engines, provided that the engines are working, from a collector 12 to the nozzles 5, passing through the portion 9 of the piping system 3 situated downstream from the valves 7. Thus, the assembly formed by said portion 9 and the nozzles 5 is purged of any residue of water-repellent liquid that may get deposited once the valves 7 are closed. Furthermore, and in order to prevent any water-repellent liquid that may be contained in the downstream portion 9 of the piping system 3 of the supply circuit 2 from flowing inside the tube 11 of the purging device 10, it is possible to provide said purging device 10 with backflow check valves 13 positioned at the connection between the tube 11 of the purging device 10 and the piping system 3 of the water-repellent liquid supply circuit 2. The backflow check valves 13 permit the passage of compressed air toward the nozzles 5 and prevent the water-repellent liquid from flowing in the reverse direction.

In order that the water-repellent liquid may be sprayed before the pressurized gas when visibility through the windshield 6 has to be improved, there are known ways of maintaining the pressure of compressed air in the tube 11, at the inlet of the backflow check valves 13, at a pressure that is approximately equal to 60 millibars and in any case strictly below the pressure of the water-repellent liquid. In general, the pressure of the water-repellent liquid ranges from 5 bars to 2 bars since there is little loss of pressure during the journey in the piping system 3 of the supply circuit 2. One of the drawbacks of the prior-art purging device 10 is that it necessitates the use of a tubing 11 that transits from the nose of the aircraft to the central section of said aircraft in which the turbo-jet engines are situated. The tube 11 has a length approximately equal to 30 meters and is subjected to numerous constraints since the pressurized gas flows therein constantly.

Furthermore, the installation of the purging device 10 is a lengthy, complex process. For, it is necessary to define the tube 11 with the constraints of segregation of the systems, use fixed supports spaced out at intervals of 0.5 meters approximately and hence pierce the structure of the aircraft in order to fix these supports. The piercing in itself requires validation design studies to ensure that it does not inappropriately weaken the structure of the aircraft. Furthermore, it is necessary to match the definitions of the tubing portions from one aircraft section to another, manufacture, bend, equip and protect the entire tube 11, install the tubing portions on each of the aircraft sections etc. The test procedure can be performed only when the entire purging device 10 is connected together on the final assembly line. The test therefore can only be done once the aircraft has been assembled and the purging device 10 has been positioned, thus making it necessary to have specific tools for the pressurizing of the pneumatic circuit.

The phases of the definition, manufacture, installation and testing of the prior-art purging device 10 thus entail a major loss of time.

SUMMARY

In one embodiment, it is sought to provide a purging device that is simple to install and costs little. It is also sought to provide a purging device of this kind that is compact.

To this end, the disclosed embodiments propose to replace the entire prior-art tubing system that constantly projects compressed air at the nozzles by a compact purging device capable of projecting compressed air.

The purging device of the disclosed embodiments comprise a gas compressor positioned in the vicinity of the windshield. For example, the compressor is situated in the aircraft cockpit. Advantageously, the compressor is used specifically for the compression of the gas designed to be projected on the windshield so that it may have reduced space requirement.

The purging device of the disclosed embodiments is, for example, operated continuously, i.e. compressed gas is continuously sprayed on the windshield while, as in the prior art, the spraying of the spray liquid is activated remotely at specific instants.

The air compressor of the disclosed embodiments can tap air directly at the position where it is situated, thus eliminating the entire length of tubing for conveying air from a particular position where it is tapped up to the nozzles. For, if the air compressor is available in the vicinity of the nozzles and hence of the windshield, the tubing length needed to convey compressed air is reduced. Furthermore, it is possible to install the entire equipment of the purging device of the disclosed embodiments directly in the nose of the aircraft. Thus, the general space requirement of the purging device is reduced. Furthermore, once the purging device has been installed and connected, the test for verifying the efficient operation of said purging device can be done immediately. It is not necessary to supply pressurized air since the compression device makes direct use of the air available in the vicinity.

One aspect of the disclosed embodiments therefore is a system for the spraying of spray liquid for an aircraft windshield comprising a spray-liquid supply circuit, a pressurized-gas supply circuit designed to purge the spray-liquid supply circuit, and at least one nozzle disposed downstream from said circuits and designed to spray the spray liquid and pressurized gas on an aircraft windshield, characterized in that the system comprises auxiliary means of compression capable of compressing gas designed to circulate in the pressurized-gas supply circuit, said auxiliary means of compression being positioned near the nozzle.

The auxiliary or ancillary compression means are additional compression means in the sense that they are added on to the spraying system specifically to compress the gas to be sprayed and are independent of the engines of the aircraft that is provided with said spraying system of the disclosed embodiments. The spray liquid spraying system of the disclosed embodiments forms an independent unit capable of working autonomously, i.e. independently of the aircraft on which it is designed for use. Such a spraying system advantageously forms a compact unit, each of the elements of said system being grouped together in a same zone of the aircraft. Installing the compression means in the vicinity of the windshields reduces the length of the pipes designed to convey the compressed gas up to said windshields. The compression means used in the prior art, on the contrary, are a turbo-jet engine of the aircraft most usually positioned at the level of the wings and therefore at a distance from the windshields, thus necessitating a substantial length of tubing.

Besides, this approach enables the spraying on the windshield of not only air but any gas whatsoever as needed, with the air tap being available on an ancillary tank containing the desired gas. For example, a tank containing nitrogen and/or oxygen is used.

The spray liquid may, for example, be a water-repellent liquid used to drive out the drops of water from the windshield in the event of rain, a cleansing liquid comprising cleansing agents or a mixture of both.

The auxiliary compression means comprise for example a compressor positioned downstream from the air tap of said pressurized-gas supply circuit.

According to examples of embodiments of the spraying system according to the disclosed embodiments, it is possible to provide for all or part of the following characteristics:

the pressurized-gas supply circuit has a filter positioned at the level of the air tap of said pressurized-gas supply circuit.

For example, the disclosed embodiments use a compressor enabling the tapping of air at a given pressure and its compression until the desired pressure is obtained. It is also possible to use a DC motor or a monophase or triphase AC motor or any means capable of compressing gas.

the compression means comprise a compressor working in DC or AC mode positioned downstream from the air tap of said pressurized-gas supply circuit.

the pressurized-gas supply circuit is provided with at least one backflow check valve capable of preventing the passage of spray liquid in the portion of the pressurized-gas supply circuit positioned upstream from said backflow check valve.

the pressurized-gas supply circuit is provided with a recovery tank capable of receiving the spray liquid flowing in the pressurized-gas supply circuit, in the event of a malfunction of the valves.

the pressure of the pressurized gas flowing in the pressurized-gas supply circuit is strictly lower than the pressure of the spray liquid flowing in the spray-liquid supply circuit, when they reach the nozzles. By maintaining air pressure at a level strictly below the pressure of the spray liquid, it is ensured that the spray liquid is sprayed at the nozzles before the pressurized gas.

Another aspect of the disclosed embodiments is also an aircraft cockpit comprising at least one system for the spraying of spray liquid.

Advantageously, and in order to reduce the general space requirement of the spraying device according to the disclosed embodiments, and more particularly of the purging device, the compression means can be positioned beneath the floor of the cockpit so that they are in the immediate vicinity of the windshield. Thus, the piping of the pressurized-gas supply circuit has a very small length.

Furthermore, the pressurized gas air tap can be taken directly beneath the floor of said cockpit. In this case, the fact of tapping air beneath the floor of the cockpit creates a tiny air leak since in flight, below a certain attitude, the air pressure within the aircraft is higher than the air pressure outside the aircraft. Naturally, air can also be tapped outside the cockpit of the aircraft in an unpressurized zone to prevent even a tiny risk of leakage. It is possible to provide for a tightly sealed air tap in the radome, i.e. the nose of the aircraft generally comprising a radar, or on the skin of the aircraft.

BRIEF DESCRIPTION OF THE DRAWINGS

The disclosed embodiments will be understood more clearly from the following description and the accompanying figures. These figures are given by way of an indication and in no way restrict the scope of the embodiments. Of the figures.

DETAILED DESCRIPTION

Figure 1:
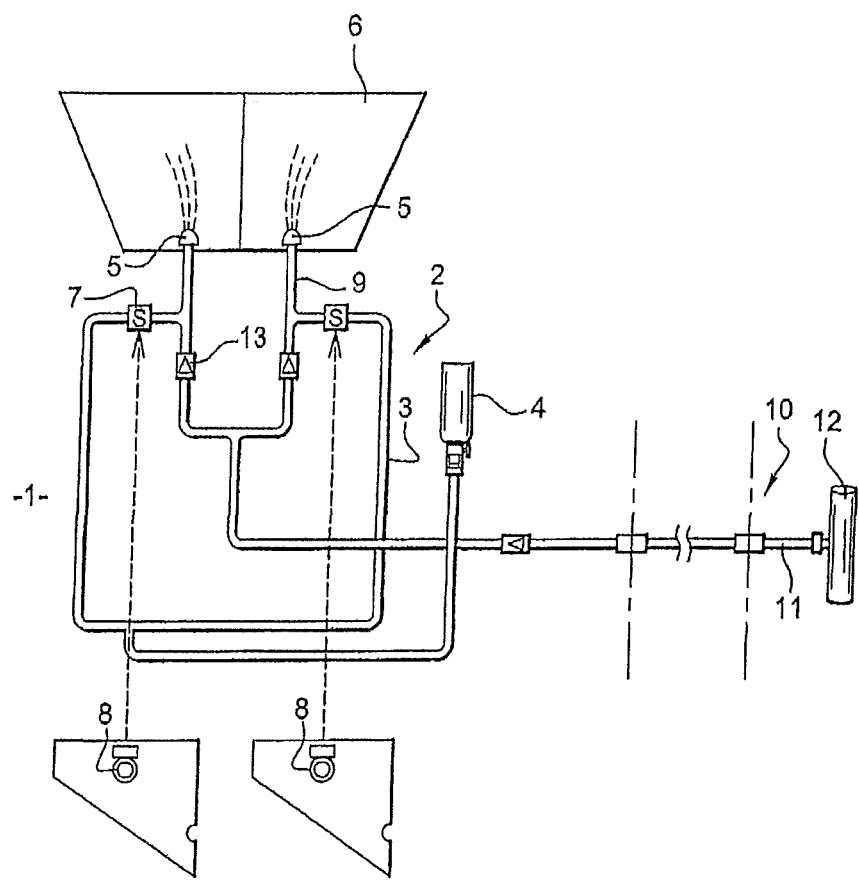
FIG. 1 is a schematic view of an already described prior-art system for the spraying of spray liquid.
Figure 2:
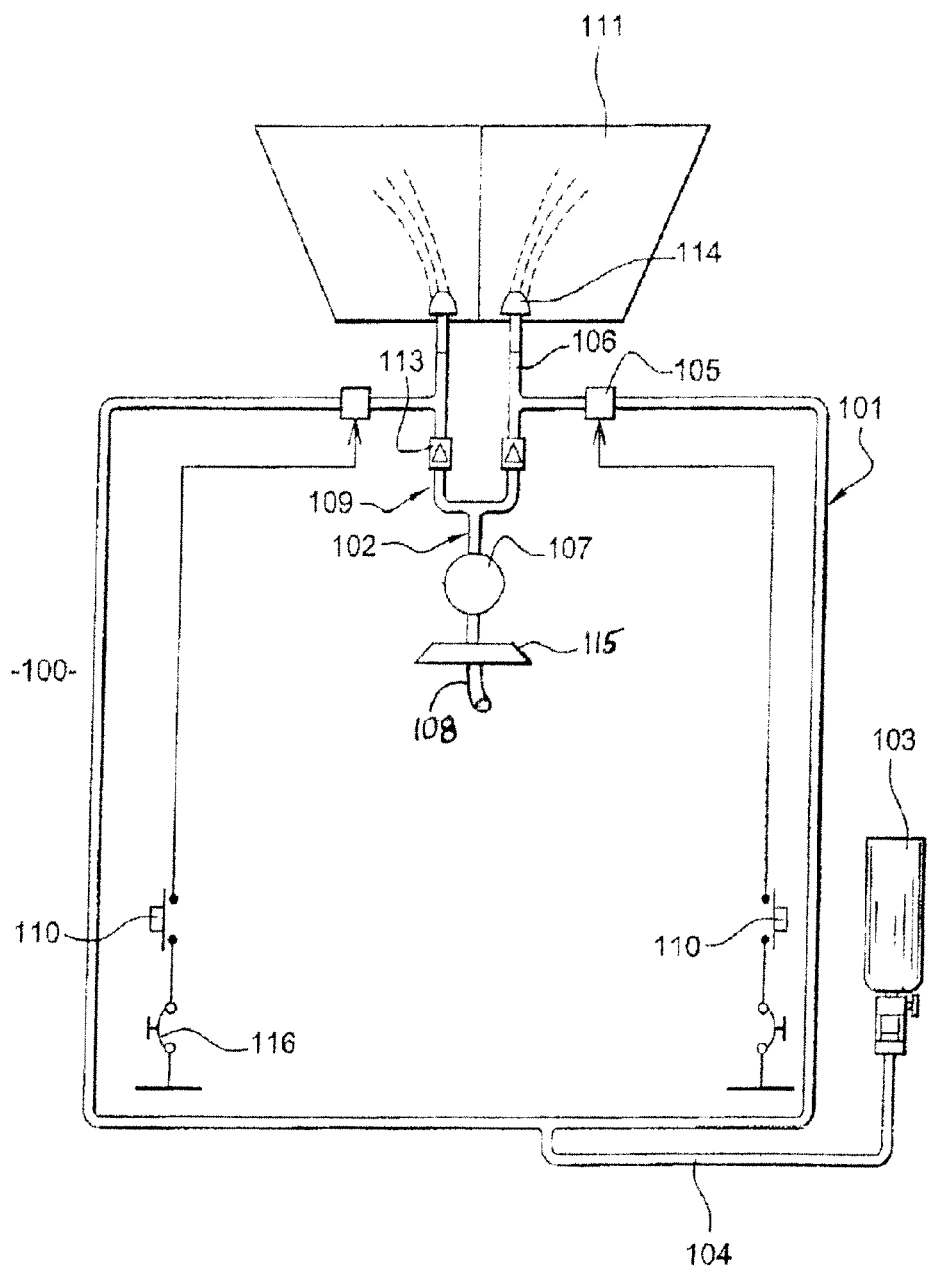
FIG. 2 is a schematic view of a system for the spraying of spray liquid according to one embodiment.

FIG. 2 shows a system 100 for the spraying of spray liquid for windshields 111 according to the disclosed embodiments. The spraying system 100 comprises a spray-liquid supply circuit 101 and a pressurized-gas supply circuit 102.

The spray-liquid supply circuit 101 has a tank 103 containing pressurized spray liquid. A first piping portion 104 is used to convey the pressurized spray liquid from the tank 103 to valves 105 blocking the pressurized spray liquid in this first piping portion 104 when the spraying system 100 is not actuated. The valves 105 of the spray-liquid supply circuit 101, when actuated, permit the passage of the spray liquid into the second piping portion 106 of the spray-liquid supply circuit 101, this second piping portion 106 enabling the pressurized spray liquid to be conveyed from the valve 105 up to the nozzles 114.

The pressurized-gas supply circuit 102 has an auxiliary compressor 107 capable of constantly compressing air tapped at the level of an air tap 108, directly in the position where said air tap 108 is situated. The air tap 108 is advantageously equipped with a filter 115. Once the filtered, tapped air passes into the compressor 107, the pressurized gas is conveyed up to the nozzles 114 by a first tubing portion 109 that leads into the second piping portion 106 also belonging to the spray-liquid supply circuit 101. The passage of the pressurized gas into the second piping portion 106 of the spray-liquid supply circuit 101, then into the nozzles 114, removes every trace of residual spray liquid and hence purges the spray-liquid supply circuit 101 from the second piping portion 106 up to the nozzles 114. Naturally, the air tap 108 can also be mounted on a gas bottle containing a desired gas other than air.

As shown in FIG. 2, an electronic control device 116, herein actuated by a pushbutton 110, actuates the opening of the valves 105 releasing the passage of the spray liquid toward the windshield 111. The spraying of spray liquid is temporary. Indeed, when the control device 116 is no longer actuated, the spraying of the spray liquid stops immediately.

In order to prevent the accidental flow of spray liquid in the pressurized-gas supply circuit 102, which could damage compressor 107, it is possible to provide the pressurized-gas supply circuit 102 with backflow check valves 113. The backflow check valves 113 prohibit the passage of any fluid from the nozzles 114 to the compressor 107, but permit the passage of pressurized gas from the compressor 107 to the nozzles 114.

It is possible to provide for a filter 115 at the air tap 108 so as not to introduce any pollution into the compressor 107 and into the piping 109, 106 and the nozzles 114.

So as to reduce the total weight of the purging device of the disclosed embodiments, i.e. of the pressurized-gas supply circuit 102, advantageously a low-mass compressor 107 is used. For example, a compressor weighing about 0.5 kg, working at a voltage of 28 V DC with a maximum amperage of 0.5 to 1 A is used.

As shown in FIG. 2, it is possible to provide several control buttons 110 to actuate the control device 116. The control buttons 110 may be positioned at different places in the cockpit, or even outside the cockpit. Thus, the pilot and co-pilot can each actuate the spray liquid spraying system 100 independently.

Figure 3:
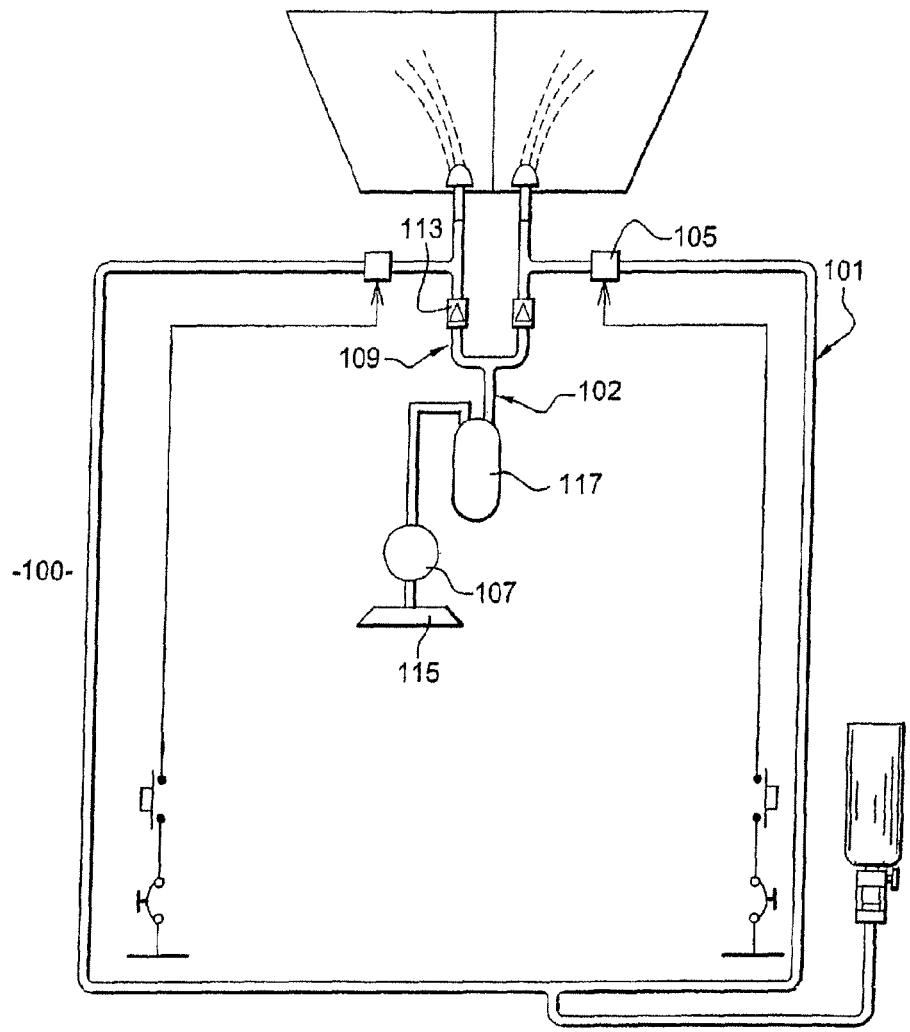
FIG. 3 is a schematic view of a system for the spraying of spray liquid according to another embodiment.

FIG. 3 shows a variant of the pressurized-gas supply circuit 102 according to the disclosed embodiments. In this example, the pressurized-gas supply circuit 102 additionally has a recovery tank 117. The tank 117 is designed to receive the spray liquid which would flow accidentally into the piping 109 of the pressurized-gas supply circuit 102 in the event of failure of the backflow check valves 113 and the valves 105 positioned downstream from the compressor 107. It is thus ensured that no spray liquid would accidentally penetrate the compressor 107, thus entailing a risk of damaging it irreversibly.

The pressurized-gas supply circuit 102 has a compressor 107 capable of compressing the air tapped at an air tap 107 directly in the position of said air tap 108 advantageously equipped with a filter. Once the filtered, tapped air passes into the compressor 107, the pressurized gas is conveyed up to the nozzles 114 by a first piping portion 109 which leads into the second piping portion 106 also belonging to the spray-liquid supply circuit 101. In crossing the second piping portion 106 of the spray-liquid supply circuit 101, which also belongs to the pressurized-gas supply circuit, and then the nozzles 114, the pressurized gas removes every trace of residual spray liquid and hence purges the spray-liquid supply circuit 101 from the second piping portion 106 to the nozzles 114.

Figure 4:
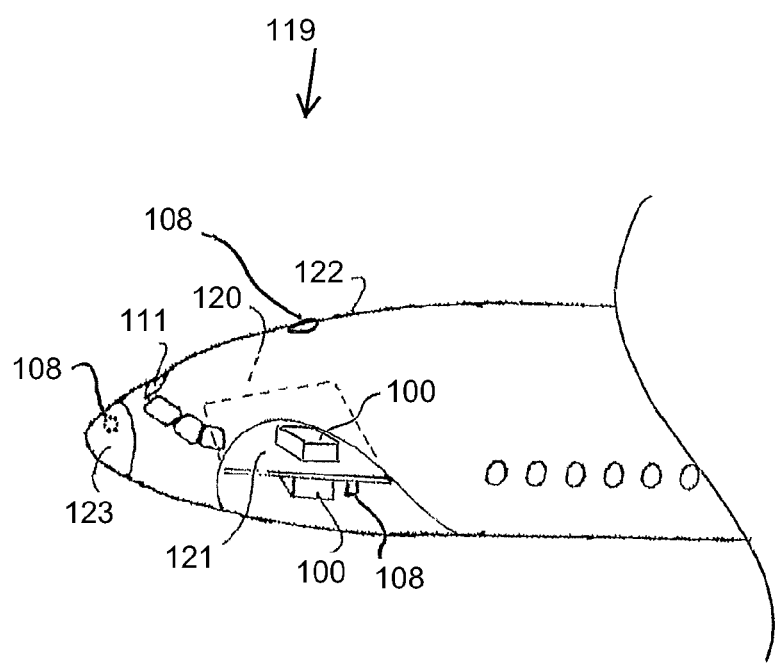
FIG. 4 shows a schematic view of a nose of an aircraft with an aircraft cockpit according to the disclosed embodiments.

FIG. 4 shows a nose 119 of an aircraft with an aircraft cockpit 120 comprising at least one system for the spraying of spray liquid on an aircraft windshield 111 as disclosed herein, where the auxiliary compression device 100 may be positioned beneath a floor 121 of the cockpit. The air tap 108 of the pressurized-gas supply circuit may be situated beneath the floor 121 of the cockpit 120, or on an external skin 122 of the cockpit 120.

The invention claimed is:

1. An aircraft comprising a cockpit having a windshield, and a system for applying spray liquid to the windshield, the system for applying spray liquid comprising:
    a spray liquid supply circuit comprising:
        a source of pressurized spray liquid;
        at least one control valve for controlling a flow of the spray liquid; and
        a first piping portion connecting the source of pressurized spray liquid and the at least one control valve;
    a pressurized-gas supply circuit comprising:
        a tap mounted on a gas container;
        at least one check valve; and
        an auxiliary compressor connected between the tap and the at least one check valve;
    the system for applying spray liquid to an aircraft cockpit windshield further comprising:
    a nozzle for applying the spray liquid to the aircraft cockpit windshield; and
    a second piping portion connecting the at least one control valve, the at least one check valve, and the nozzle, wherein the pressurized-gas supply circuit delivers gas from the gas container to the second piping portion to purge the second piping portion and the nozzle.

2. The aircraft of claim 1, wherein the auxiliary compressor is adapted for continuous operation.

3. The aircraft of claim 1, wherein the tap of the pressurized-gas supply circuit is equipped with a filter.

4. The aircraft of claim 1, wherein the at least one check valve is adapted to prevent a passage of spray liquid into the pressurized-gas supply circuit.

5. The aircraft of claim 1, wherein the pressurized-gas supply circuit further comprises a recovery tank connected between the compressor and the at least one check valve, the recovery tank adapted to collect spray liquid flowing from the check valve into the pressurized-gas supply circuit.

6. The aircraft of claim 1, wherein a pressure of gas flowing in the pressurized-gas supply circuit is lower than a pressure of the spray liquid flowing in the spray-liquid supply circuit.

7. An aircraft cockpit having a floor, and aircraft cockpit windshield and a system for applying spray liquid to the aircraft cockpit windshield, the system for applying spray liquid to the aircraft cockpit windshield comprising:
    a spray liquid supply circuit comprising:
        a source of pressurized spray liquid;
        at least one control valve for controlling a flow of the spray liquid; and
        a first piping portion connecting the source of pressurized spray liquid an the at least one control valve;

a pressurized-gas supply circuit comprising:
- a tap mounted on a gas container;
- at least one check valve; and
- an auxiliary compressor connected between the tap and the at least one check valve;

the system for applying spray liquid to an aircraft cockpit windshield further comprising:
- a nozzle for applying the spray liquid to the aircraft cockpit windshield; and
- a second piping portion connecting the at least one control valve, the at least one check valve, and the nozzle, wherein the pressurized-gas supply circuit delivers gas from the gas container to the second piping portion to purge the second piping portion and the nozzle.

8. The aircraft cockpit according to claim 7, wherein the auxiliary compressor device is positioned beneath the floor of said cockpit.

9. The aircraft cockpit according to claim 7, wherein the auxiliary compressor device is positioned in said cockpit.

* * * * *